Feb. 9, 1960 J. HIMKA 2,924,265
VEHICLE SEAT
Filed April 14, 1955 10 Sheets-Sheet 1
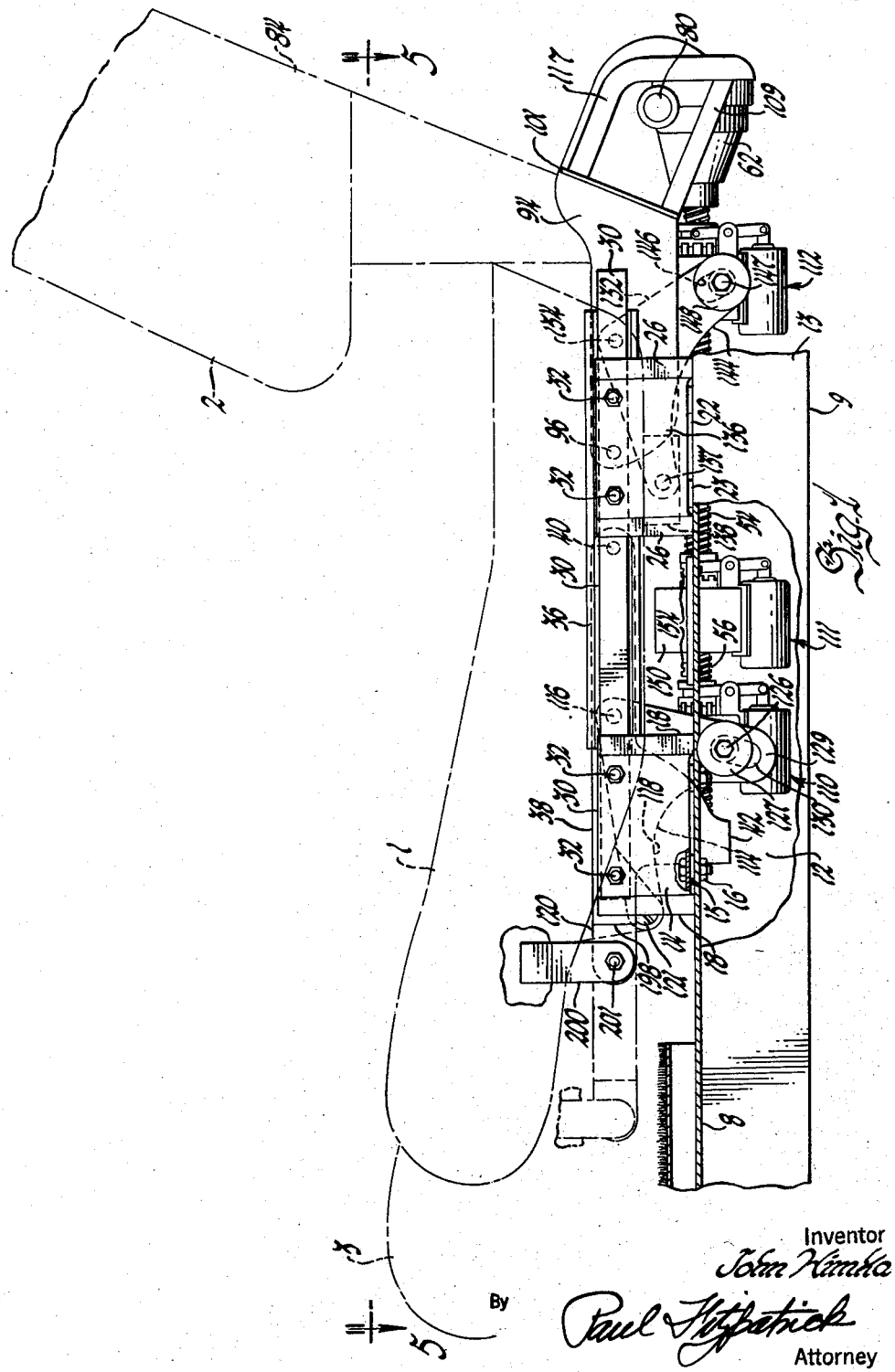
Inventor
John Himka
By Paul Fitzpatrick
Attorney

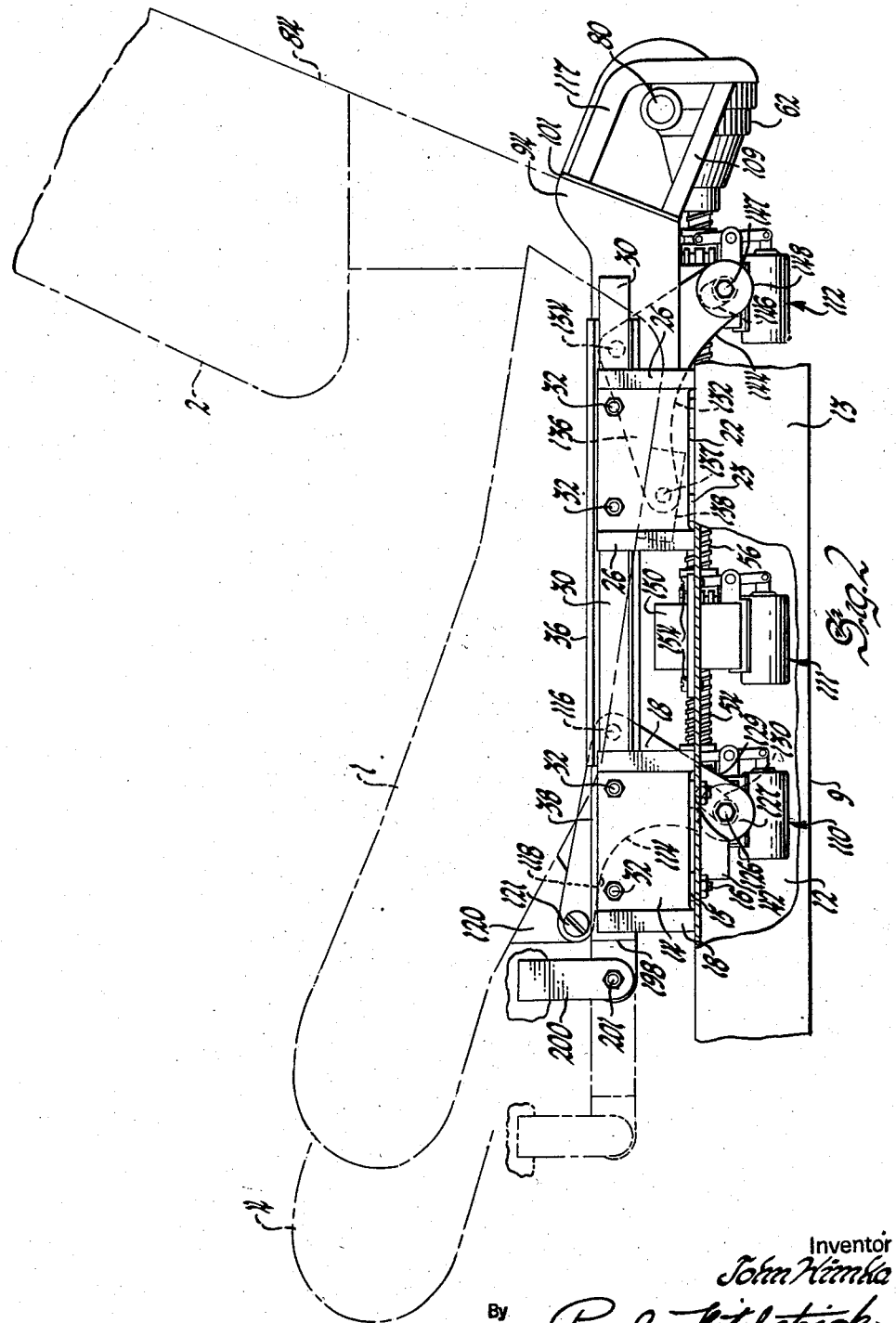

Feb. 9, 1960   J. HIMKA   2,924,265
VEHICLE SEAT
Filed April 14, 1955   10 Sheets-Sheet 3
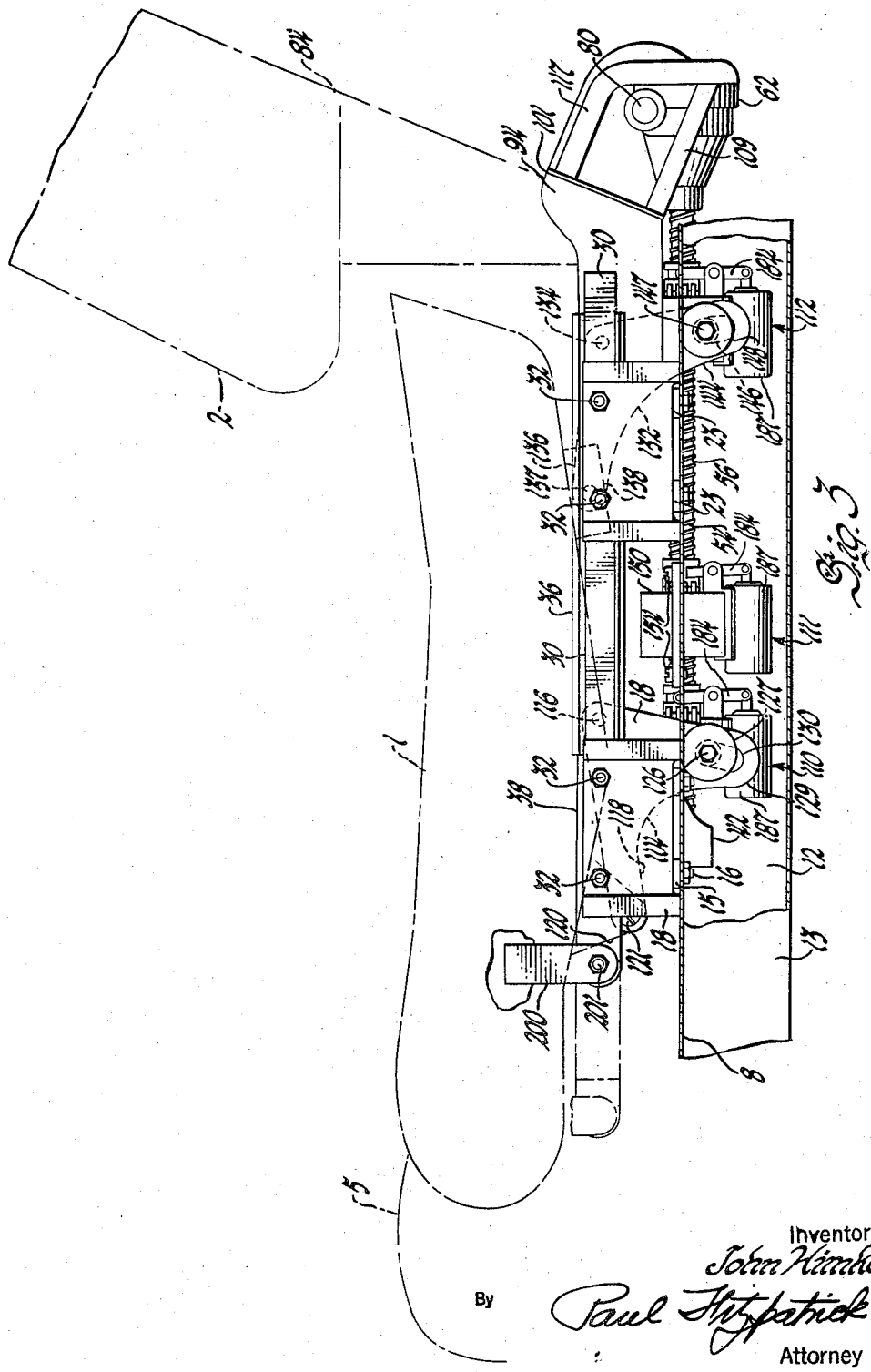
Inventor
John Himka
By Paul Fitzpatrick
Attorney Feb. 9, 1960  J. HIMKA  2,924,265
VEHICLE SEAT
Filed April 14, 1955  10 Sheets-Sheet 4
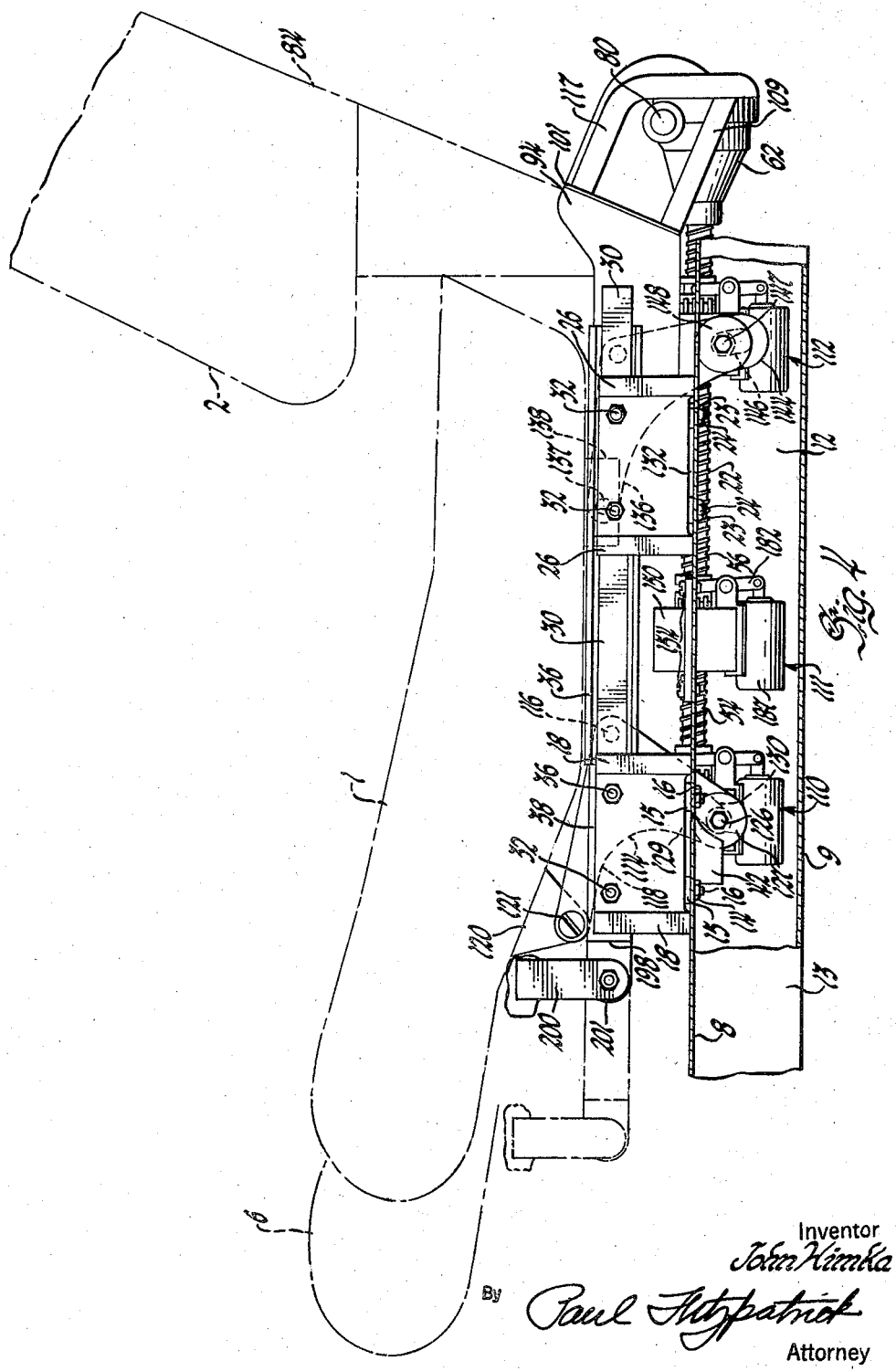
Inventor
John Himka
By Paul Fitzpatrick
Attorney Feb. 9, 1960    J. HIMKA    2,924,265
VEHICLE SEAT
Filed April 14, 1955    10 Sheets-Sheet 5
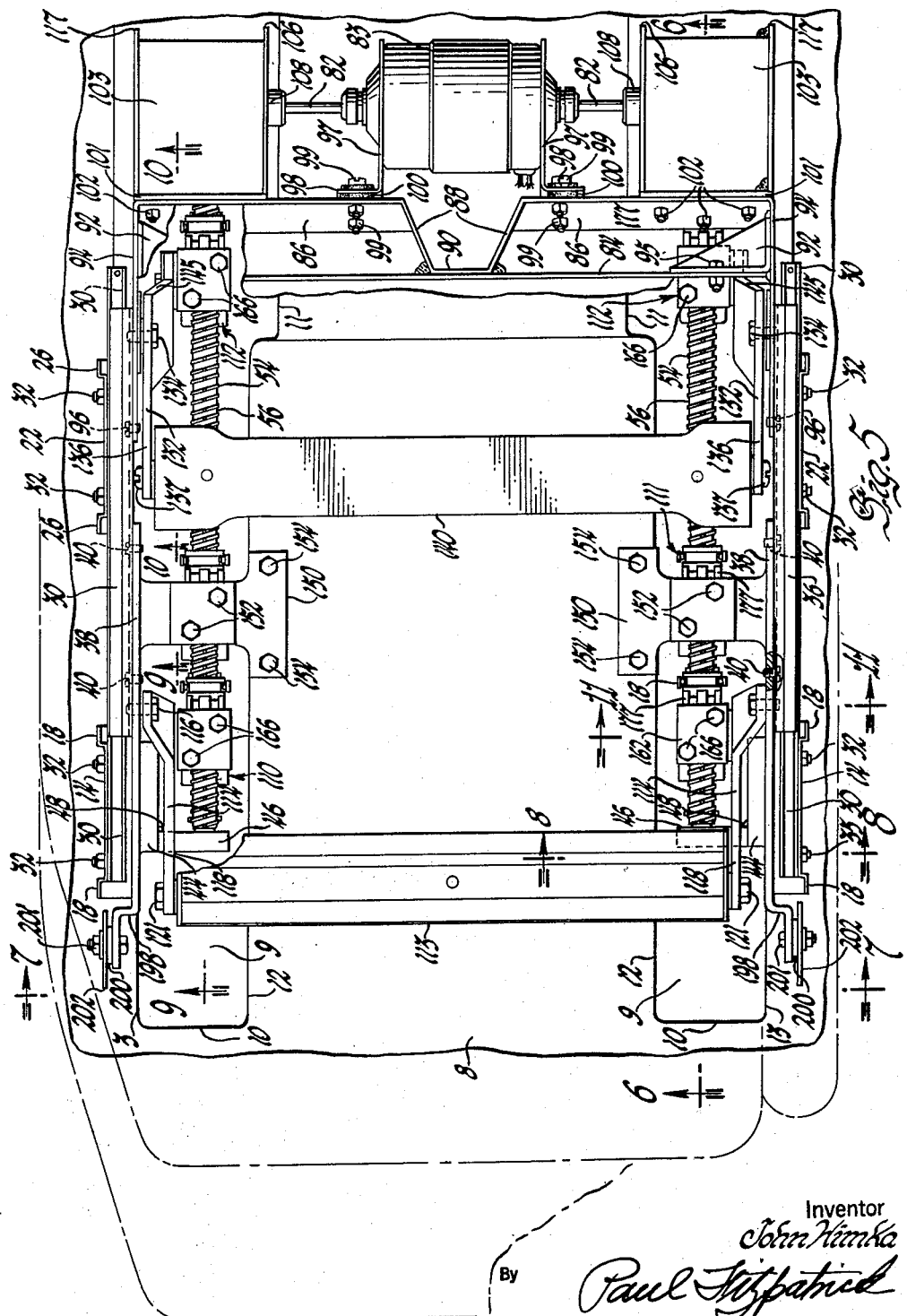
Inventor
John Himka
By Paul Fitzpatrick
Attorney

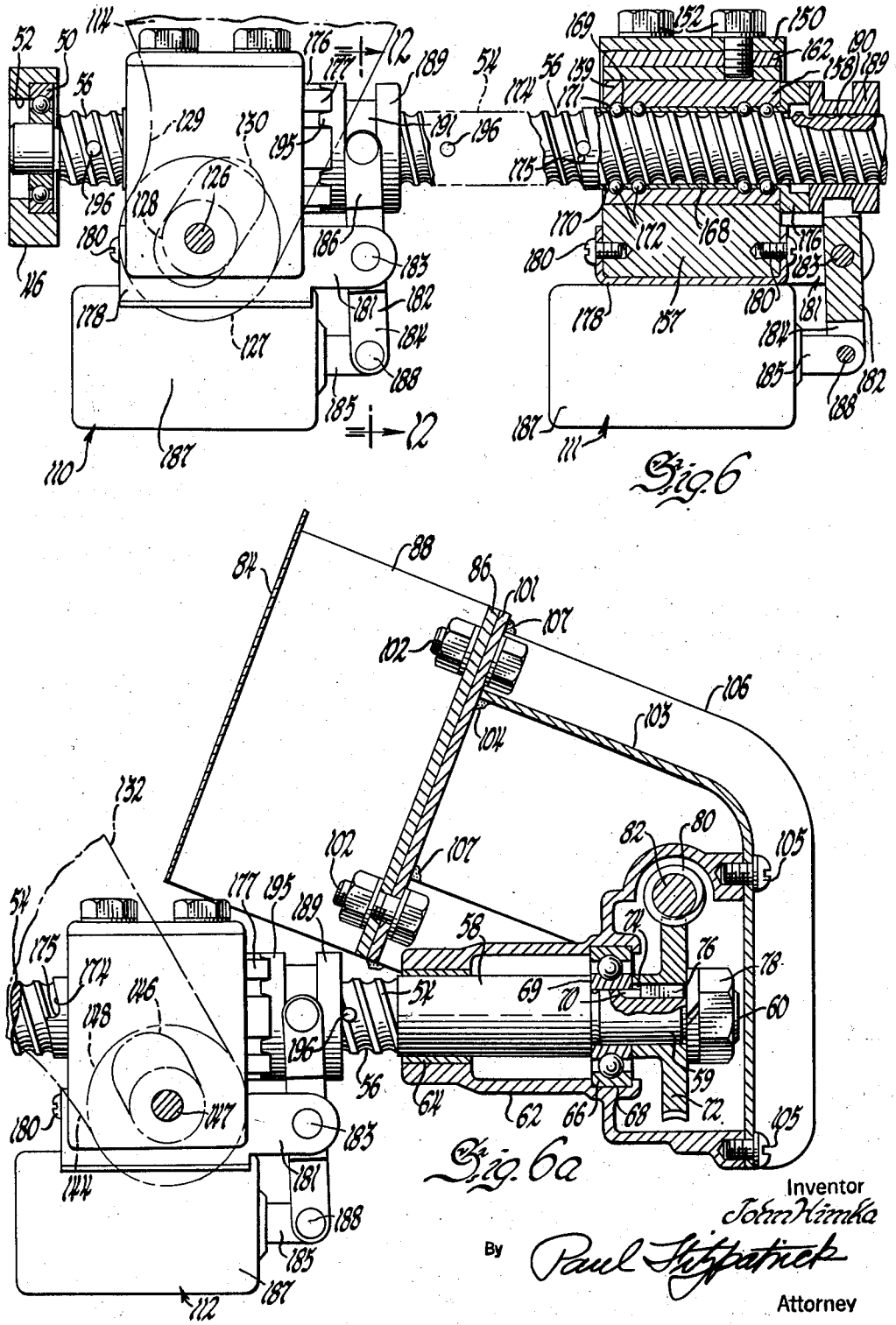

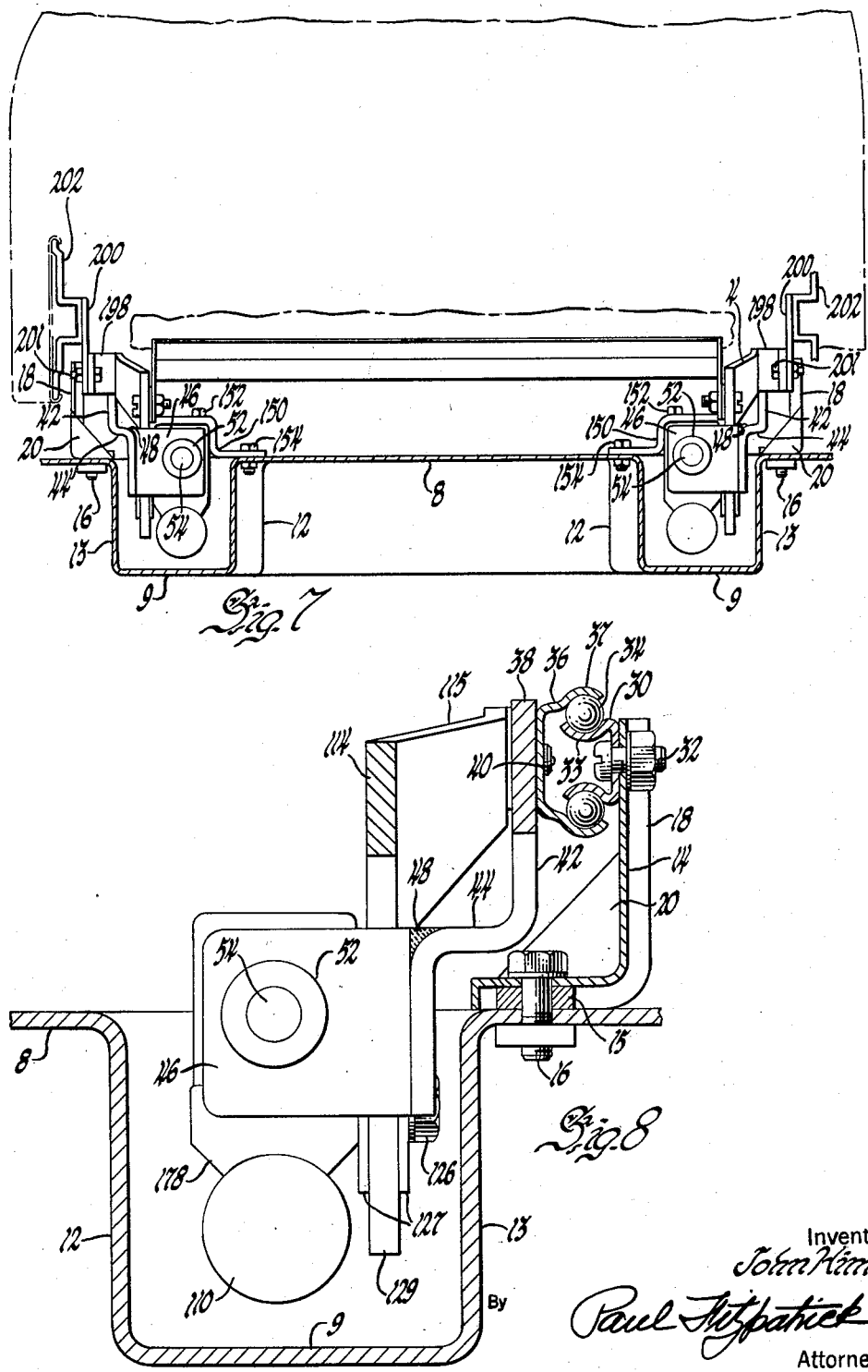

Feb. 9, 1960   J. HIMKA   2,924,265
VEHICLE SEAT
Filed April 14, 1955   10 Sheets-Sheet 8

Inventor
John Himka
By Paul Fitzpatrick
Attorney

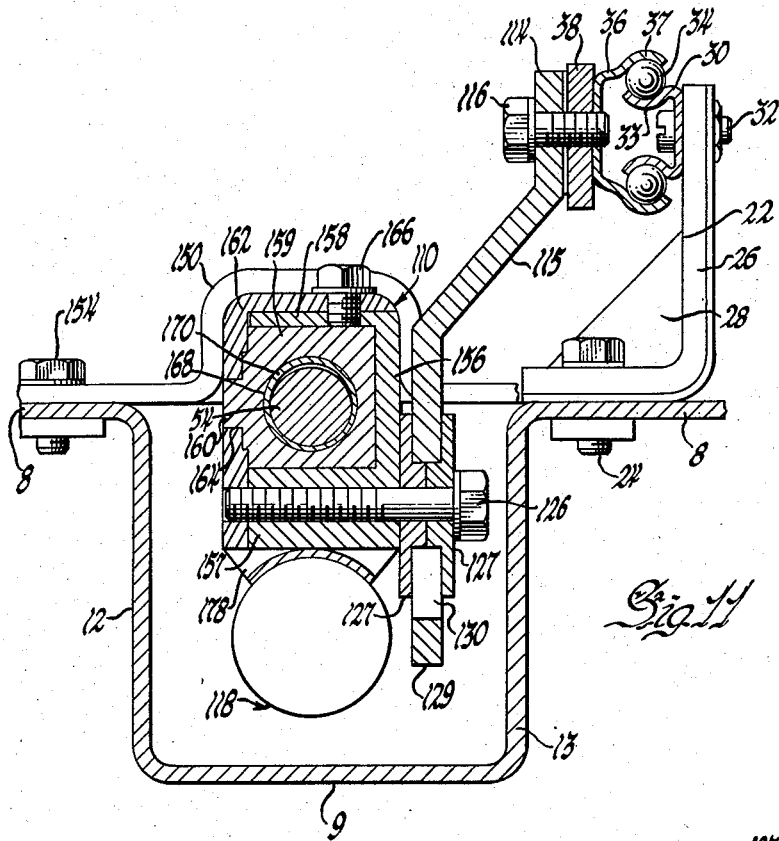
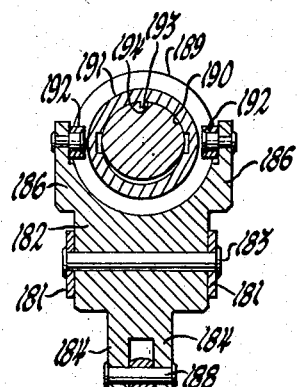

United States Patent Office 2,924,265
Patented Feb. 9, 1960

2,924,265

VEHICLE SEAT

John Himka, Detroit, Mich., assignor to General Motors Corporation, Detroit, Mich., a corporation of Delaware Application April 14, 1955, Serial No. 501,246

8 Claims. (Cl. 155—14)

This invention relates to a vehicle seat assembly and more particularly to a vehicle seat assembly wherein the seat bottom is vertically movable independently of the seat back and is horizontally movable with the seat back.

An object of this invention is to provide a vehicle seat assembly having a seat bottom which is selectively movable in vertical directions independently of the seat back. Another object of this invention is to provide a vehicle seat assembly having a seat bottom which can be tilted to various positions with respect to the horizontal by vertically adjusting either the forward or rearward parts of the seat bottom independently of the seat back. A further object of this invention is to provide a vehicle seat assembly having a seat bottom which is selectively movable in vertical directions independently of the seat back and selectively movable in horizontal directions with the seat back regardless of the vertical position of the seat bottom.

These and other objects of this invention will be readily apparent from the following specification and drawings, in which:

Figure 1 is a side view of the seat assembly in its normal position;

Figure 2 is a view of the seat assembly with the forward part of the seat bottom tilted upwardly;

Figure 3 is a view of the seat assembly with the rearward part of the seat bottom tilted upwardly;

Figure 4 is a view of the seat assembly with the seat bottom in its extreme vertically raised position;

Figure 5 is a top plan view of the actuating mechanism for the seat assembly;

Figure 6 is a sectional view on the plane indicated by line 6—6 of Figure 5;

Figure 6a is a sectional view on the plane indicated by line 6—6 showing the rearward seat actuating mechanism;

Figure 7 is a sectional view on the plane indicated by line 7—7 of Figure 5;

Figure 8 is a fragmentary sectional view on the plane indicated by line 8—8 of Figure 5;

Figure 11 is a sectional view on the plane indicated by line 11—11 of Figure 5;

Figure 12 is a sectional view on the plane indicated by line 12—12 of Figure 6.

Figure 9:
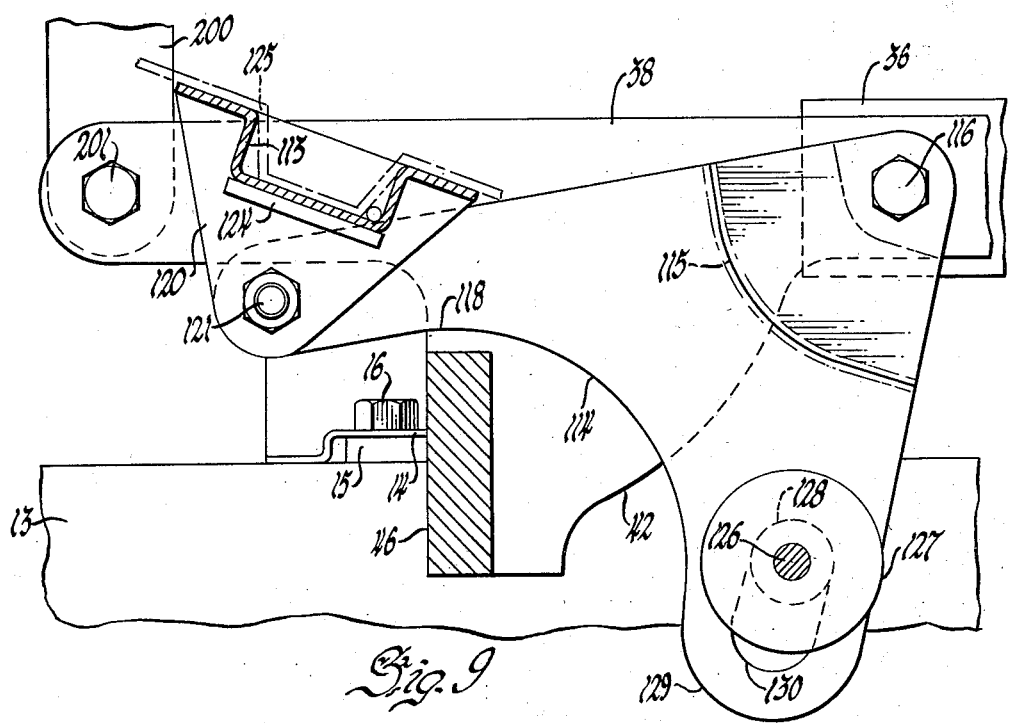
Figure 9 is a view showing the forward linkage arrangement of the vehicle seat assembly.

Referring now to Figures 1 through 4 of the drawings, the various positions of the vehicle seat assembly will be described. The seat assembly includes a seat bottom 1 and a seat back 2, and in each of the figures the vehicle seat assembly is shown in an extreme rear position. The seat assembly is horizontally movable from this position to an extreme forward position indicated by dash lines 3, 4, 5, and 6, respectively, in each of the figures, and is also selectively movable to various horizontal positions between these extreme positions.

In Figure 1 the seat bottom is in an extreme lower position and in Figure 4 the seat bottom is in an extreme upper position. Figure 2 shows the forward part of the seat bottom in the upper position and the rear part in the lower position; and Figure 3 shows the rearward part of the seat bottom portion in the upper position and the front part in the lower position. The seat bottom is also selectively movable to various positions between these extreme positions.

The seat bottom is selectively movable to any vertical position regardless of the horizontal position of the seat assembly. Likewise, the seat assembly is selectively movable to any horizontal position regardless of the vertical position of the seat bottom. The seat back can move only in a horizontal direction.

The seat actuating mechanism is the same on either side of the seat and, therefore, like numerals will be used for like parts.

Referring now to Figures 5, 7, 8, and 11, the vehicle floor pan 8 is provided with a pair of spaced parallel wells 9 which extend downwardly from the floor pan and provide a housing for part of the seat actuating mechanism as can be clearly seen in Figures 7, 8, and 11. Each well has a forward terminal wall 10, a rear terminal portion 11, and inner and outer side walls 12 and 13, respectively. A pair of forward seat support brackets 14 are spaced from the outer side wall 13 of each well and are secured to the body floor pan 8 by spacing washers 15 and bolts 16. Each bracket 14 is provided with strengthening ribs 18 and webs 20. A similar pair of rear seat support brackets 22 are also spaced from the outer side wall 13 of each well in alignment with brackets 14 and are secured to the body floor pan by spacing washers 23 and bolts 24. Each bracket 22 is also provided with strengthening ribs 26 and webs 28, Figure 11.

A channel 30 of the fore and aft seat adjustment track is secured to each pair of aligned brackets 14 and 22 by bolts 32. The legs 33 of each channel 30 are rolled to form inner races for ball bearings 34. A channel 36 fits over each channel 30 and the legs 37 of this channel are rolled oppositely to legs 33 to provide the outer races for the ball bearings. Suitable stops are provided at each end of channel 36 to prevent loss of the ball bearings. The channel members and ball bearings provide a seat adjusting mechanism of known type allowing horizontal movement of the seat assembly. Channels 30 are stationary and channels 36 move fore and aft thereon. The forward end of each channel 36 is secured to a support member 38 (Figure 8) by bolts 40. Support members 38 have downwardly extending portions 42 which are bent at right angles at 44 to form mountings for front bearing blocks 46. The front bearing blocks are welded to portions 42 at 48, and a conventional ball bearing assembly 50 (Figure 6) is mounted within a shouldered bore 52 in each bearing block. The front bearing blocks 46 support the forward end of rotatable shafts 54 which are provided with a continuous helical groove or thread 56.

Referring now to Figures 5 and 6a, the rear ends 58 of shafts 54 have reduced shank portions 59 and threaded ends 60. Portions 58 and 59 are supported within housings 62 by plain bearings 64 and ball bearings 66. The outer races of bearings 66 are mounted within annular grooves 68 in the housings, and the inner races abut against shoulders 69 of the shafts. Shank portions 59 are provided with keyways 70, and worm gears 72 having corresponding keyways 74 are secured to portions 59 by keys 76 fitting in both keyways. Nuts 78 are threaded on ends 60 to hold the hubs of the gears against the inner races of the bearings. Gears 72 are driven by worms 80 fixed on the shafts 82 of a reversible electric motor 83. The free ends of the worms are journalled in housings 62, as can be seen in Figure 1.

The rear surface of seat back 2 is covered by a plate 84, the upper part of which is shaped to the general outline of the seat back. A bracket 86 (Figures 6 and 6a) extends the full width of the seat back and is spaced from plate 84 by angularly extending portions 88 and flat portion 90. Flat portion 90 is welded to plate 84 and additional rigidity is imparted to bracket 86 by webs 92 which are welded to arm portions 94 of bracket 86 and bolted to plate 94 at 95. Arms 94 of bracket 86 extend forwardly along the sides of the seat bottom 1, and their general outline can be seen in Figures 1 and 10. The rear portion of each channel 36 is secured to arms 94 by bolts 96.

Thus, the stationary seat support is formed by brackets 14 and 22 and channels 30, and the seat supporting frame which moves relative to the stationary seat support is formed by plate 84, bracket 86 having arms 94, and channels 36.

Motor 83 is mounted on bracket 86 by brackets 97 having laterally extending arms 98 bolted to bracket 86 at 99. Rubber washers 100 are used on both sides of arms 98 to reduce noise by preventing the vibration of the motor from being transferred to plate 84 by metal to metal contact. A pair of plates 101 are bolted to bracket 86 at 102, Figure 6a, and angularly extending plates 103 are welded to plates 101 at 104. Plates 103 cover the openings of housings 62 and are bolted to the housings at 105. Plates 106 are also welded to plates 101 at 107 and provide supports for bearing blocks 108 for shafts 82.

Plates 101, 103, and 106 support the housings 62 for the rear ends 58 of shafts 54 and also impart additional rigidity to the vehicle seat supporting frame. Struts 117 and 109, Figures 1 and 5, are welded to plates 84 and 101 to provide additional rigidity to plates 84. Thus, it can be seen that the entire motor and drive assembly are carried by the seat supporting frame rather than being mounted on the floor pan 8 as in usual seat assemblies. This feature of the invention allows a very simple drive assembly to be used to supply power to the seat actuating mechanism rather than requiring a complicated driving mechanism as in usual power operated seat actuating mechanisms.

Referring now to Figures 5, 6, and 6a, three like traveling nut assemblies 110, 111, and 112 are mounted on each shaft 54. Assemblies 110 and 112 transform rotation of the shafts into fore and aft movement of the assemblies along the shaft, and assemblies 111 transform rotation of the shafts into fore and aft movement of the shafts with relation to assemblies 111. Nut assemblies 110 and 112 control the vertical movement of the seat bottom 1 when operated at the same time and control the vertical movement of the forward and rearward seat bottom parts, respectively, when separately operated. Nut assemblies 111 control the horizontal movement of the entire seat assembly.

Referring now to Figures 5, 9, and 11, a pair of forward bell cranks 114 are offset at 115 and are pivotally connected to support members 38 and channels 36 by bolts 116. One arm 118 of the bell cranks is pivotally connected to brackets 120 by bolts 121. Brackets 120 are secured to a seat bottom front support bar 113 and have laterally extending tab portions 124 which provide additional strength at the joint. The seat bottom supporting frame, indicated schematically at 125, may be secured to bar 113 by suitable attaching means. Bolts 126 threaded in nut assemblies 110 support pairs of pulley members 127 having abutting hub portions 128. The other arms 129 of bell cranks 114 are slotted at 130 and the hub portions 128 of the pulley members extend into slot 130 from either side and form a pivotal and sliding connection between nut assemblies 110 and bell cranks 114.

Figure 10:
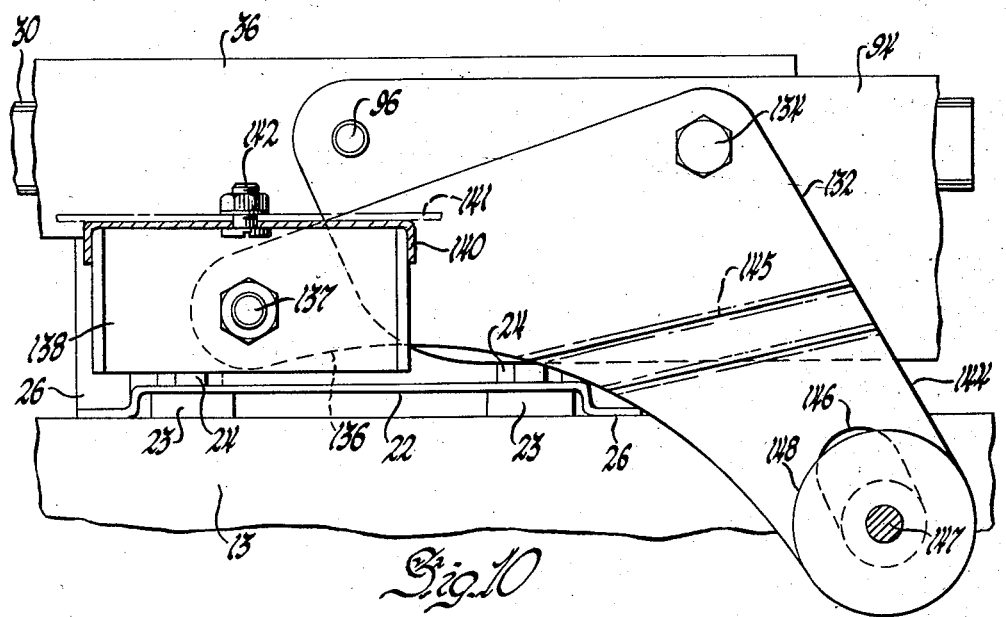
Figure 10 is a view showing the rearward linkage assembly of the vehicle seat assembly.

Referring now to Figures 5 and 10, a pair of rear bell cranks 132 are pivotally connected to arm portions 94 of bracket 86, and channel members 36 by bolts 134. One arm 136 of the bell cranks is pivotally connected by bolts 137 to brackets 138 which are welded to a seat bottom rear support bar 140. The seat bottom supporting frame, indicated schematically at 141, may be secured to bar 140 as by bolts 142. The other arm 144 of bell cranks 132 is offset at 145 and slotted at 146. Bolts 147 threaded in nut assemblies 112 support pairs of pulley members 148 which extend into slots 146 from either side and form a pivotal and sliding connection between nut assemblies 112 and bell cranks 132.

Nut assemblies 111 are fixed to the vehicle floor pan 8 by U-shaped brackets 150 (Figures 5, 7, and 11) which are bolted to the nut assemblies at 152 and to the floor pan 8 at 154. Rubber washers can be used at 154 to reduce the noise of operation. Each of the nut assemblies operates in the same manner and, therefore, only the operation of one assembly will be particularly described.

Referring now to Figures 6, 11, and 12, the body of the nut is a U-shaped member 156 having one leg 157 thicker than the other leg 158, a block 159 tightly fitting between the legs of member 156 and having a laterally extending portion 160, and an angular cover member 162 having a slot 164 fitting over portion 160 of member 159. In nut assemblies 110 and 112, cover member 162 is secured to leg 158 of member 156 by bolts 166, and bolts 126 and 147, respectively, further secure the cover member to leg 157 of member 156. In nut assemblies 111, bolts 152 secure the cover member 162 to leg 158 and also fix the nut assemblies to brackets 150 as hereinbefore described.

Block member 159 is provided with a bore 168 and a series of axially spaced annular grooves 169. A sleeve 170 fits within bore 168 and is provided with axially spaced circular openings 171 which are in alignment with grooves 169. A series of balls 172 fit within openings 171 and extend into annular grooves 169 and the continuous helical groove 56 of shaft 54. One end of sleeve 170 is formed to a cam surface 174 terminating in a shoulder 175. The other end of sleeve 170 is provided with a hub portion 176 which has a series of annularly spaced teeth 177. A bracket 178 secured to leg 157 by bolts 180 has a pair of extending arms 181. Lever 182 (Figures 6 and 12) is pivotally mounted between arms 181 by pin 183 and has oppositely extending bifurcated arms 184 and 186. A solenoid 187 is secured to bracket 178 and the solenoid armature 185 is pivotally connected to arms 184 by pin 188. Arms 186 of lever 182 extend around a collar 189 slidably mounted on shaft 54 and having a bore 190 and an annular groove 191. Bearing buttons 192 on arms 186 ride in groove 191. Collar 189 has a series of spaced teeth 195 (Figure 6) fitting between teeth 177 of hub portion 176 to clutch the collar to sleeve 170. Collar 189 has an axially extending key 193 (Figure 12) which fits within a slot 194 extending the full length of rotatable shaft 54. Pins 196 extend through shafts 54 at both sides of each nut assembly and limit the axial movement of the nut assemblies 110 and 112 along the shaft or movement of the shaft relative to the nut assembly 111. It should be remembered that nut assemblies 111 are fixed to the floor pan 8 and, therefore, shafts 54 move through these nut assemblies.

The operation of a nut assembly will now be described. Assume that shaft 54 is rotating and collar 189 is clutched to sleeve 170 by interfitting teeth 195 and 177, respectively. Since collar 189 is keyed to the shaft, sleeve 170 rotates with the shaft and balls 172 move in annular grooves 169 but do not move along helical groove 56 since the sleeve and shaft rotate as a unit. The nut assembly, therefore, does not travel along the shaft but remains in position. Thus, it can be seen that whenever the sleeve 170 is clutched to the shaft by collar 189 or other means, the nut assembly remains in position.

Assuming now that shaft 54 is rotating and solenoid 187 is energized so that solenoid armature 185 moves lever 182 in a clockwise direction about pin 183 to declutch collar 189 from sleeve 170. Sleeve 170 and balls 172 now do not rotate with shaft 54 but remain stationary with respect to the nut assembly. Balls 172 do not move in grooves 169 but move along helical groove 56 causing the nut assembly to travel along shaft 54. The nut assemblies will travel forward or rearward along shaft 54 depending on the direction of rotation of the shaft. In order to limit the movement of the nut assembly, pins 196 are provided on either side of the nut assembly. If the nut assembly travels to its forward limit of movement, then cam surface 174 and shoulder 175 engage pin 196 and clutch sleeve 170 to shaft 54, causing the sleeve to rotate with the shaft and thereby causing the nut assembly to remain in position on the shaft as hereinbefore explained. If the nut assembly travels to its rearward limit of movement, collar 189 abuts against pin 196 and as soon as the nut assembly has moved to a point where teeth 177 engage teeth 195 against the action of the solenoid armature 185, then sleeve 170 is clutched to shaft 54 thereby causing the nut assembly to remain in position as hereinbefore explained.

Referring now particularly to nut assemblies 110 and 112, if they travel forwardly along shafts 54, then the seat bottom 1 is raised to its extreme upper position (Figure 4) by bell cranks 114 and 132, respectively. If the nut assemblies travel rearwardly along shafts 54, then the seat bottom portion 1 is lowered to its normal or extreme lower vertical position (Figure 1). Pins 196 set the vertical limits of seat bottom 1 by determining the extent of travel of the nut assemblies along the shaft. If nut assemblies 110 only are allowed to travel along shafts 54, then the forward part of seat bottom 1 is moved between its lower and upper extreme positions (Figures 1 and 2) by bell cranks 114. Likewise, if nut assemblies 112 only are allowed to travel along shafts 54, then the rear part of seat bottom 1 is moved between its lower and upper extreme positions (Figures 1 and 3) by bell cranks 132. It should also be noted that the seat bottom 1 and its forward and rear parts are selectively movable to any vertical position between their extreme vertical positions by merely de-energizing the solenoid at the appropriate position of the nut assemblies on the shafts instead of letting the nut assemblies engage either pin 196 at the extreme limits of movement of the nut assemblies.

It has been found that if bell cranks 114 and 132 are separately moved to raise and lower either the forward or rearward parts of the seat bottom portion 1, there would be a tendency to bind at single point pivotal connections between the bell cranks and the nut assemblies. Therefore, sliding and pivoting connections are used at this point of attachment to prevent binding.

Referring now particularly to nut assemblies 111, it should be remembered that they are fixed to the vehicle floor pan 8 and cannot travel along shafts 54. Thus, if the sleeves 170 of these assemblies are declutched from their collars 189, shafts 54 will move fore and aft with respect to the nut assemblies depending on the direction of rotation of the shafts. This fore and aft movement of the shafts with respect to the nut assemblies is the horizontal movement of the seat assembly, and it can be seen that this horizontal movement can take place regardless of the vertical position of the seat bottom portion 1, inasmuch as nut assemblies 110 and 112 are carried by shafts 54. Pins 196 on either side of nut assemblies 110 and 112 limit the horizontal movement of the shafts and vehicle seat assembly as hereinbefore explained.

If it is desired to cover those portions of the seat actuating mechanism not within wells 9, support members 38 can be offset at 198 (Figure 7) and brackets 200 (Figures 1 and 7) can be bolted to members 38 at 201 to support brackets 202 to which the covers may be attached. The rearward portions of the covers can be attached by suitable means to the seat back plate 84 or arms 94 of bracket 86.

Figure 13:
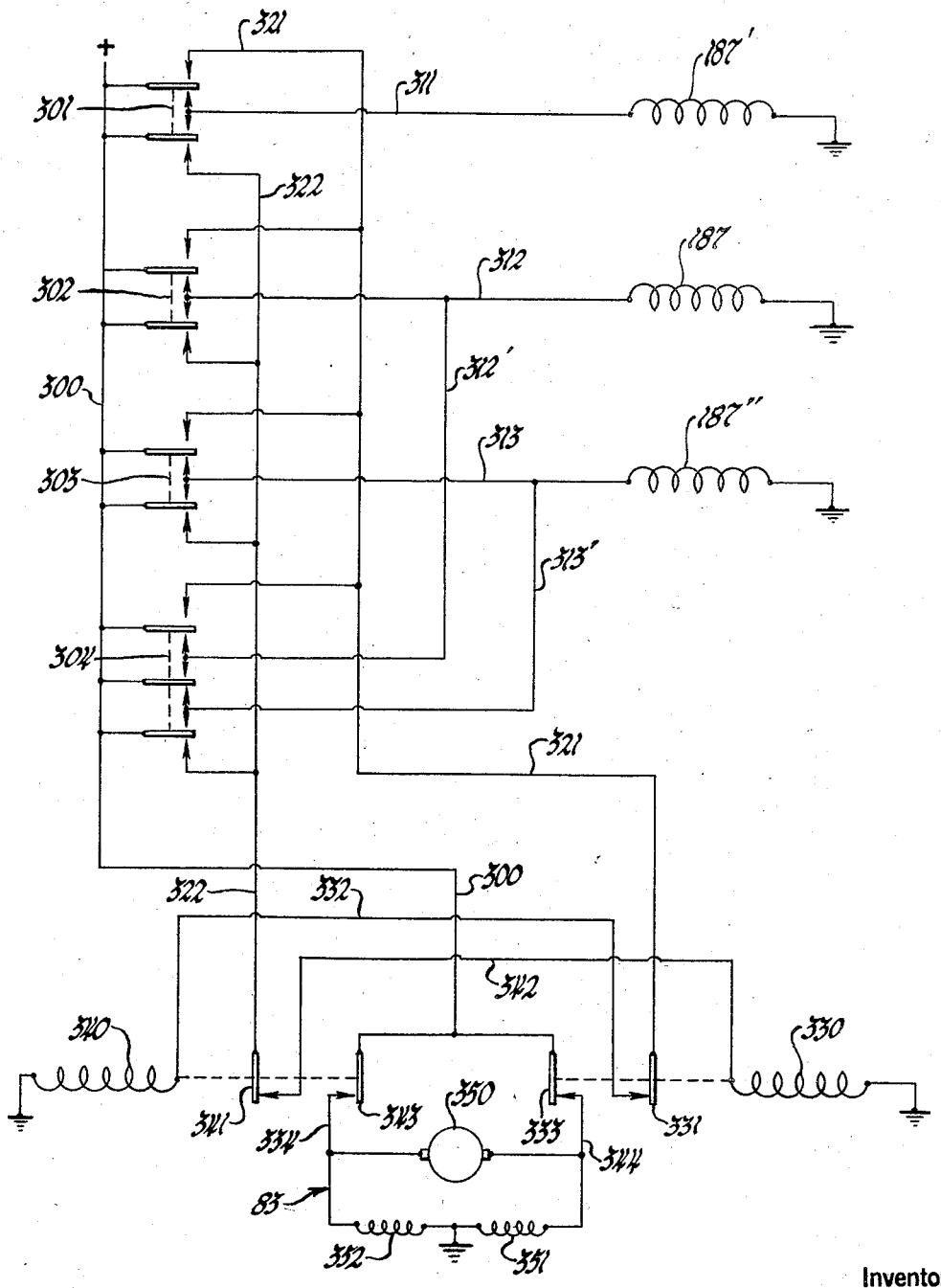
Figure 13 is a wiring diagram.

To adjust the seat in horizontal and vertical directions, the solenoids 187, 187′ and 187″ of nut assemblies 110, 111, and 112 must be energized and motor 83 must be selectively energized to run in either direction. Various circuits may be devised for the purpose, but a simple and suitable circuit is illustrated in Figure 13 in which a power source (not shown) is connected to bus 300. Double-pole double-throw switches 301, 302, and 303, and a triple-pole double-throw switch 304 are connected to the bus. These switches are all of the normally open manually operated type. Switch 301 when operated in either direction energizes fore and aft solenoid 187′ from bus 300 through line 311, and switches 302 and 303 similarly energize solenoids 187 and 187″ through lines 312 and 313, respectively. A branch line 312′ connected to line 312 and a branch 313′ connected to line 313 are connected to the contacts of the triple-pole switch 304. When this switch is moved to either operated position, both lines 312′ and 313′ are energized from the bus 300 so that the front up and down and the rear up and down solenoids are both energized.

It will be apparent, therefore, that switch 301 controls horizontal movement of the seat assembly, switch 302 controls up and down movement of the front part of the seat bottom, switch 303 controls up and down movement of the rear part of the seat bottom, and switch 304 controls up and down movement of the seat bottom. The upper contacts of switches 301, 302, 303, and 304 as shown in the diagram, which are closed when the respective switches are moved upwardly, are connected in parallel to a motor control line 321. The lower contacts of switches 301, 302 303, and 304, which are closed when the respective switches are moved downwardly, are connected in parallel to a motor control line 322. Lines 321 and 322 control the energization of the motor for operation in either direction, this control being effected through power relays interlocked so that it is impossible to energize both at once by concurrent actuation of two of the manual switches.

Motor control line 321 is connected through back contact 331 of power relay coil 330, line 332, and power relay coil 340 to ground. Similarly, line 322 is connected through back contact 341 of power relay coil 340, line 342, and relay coil 330 to ground. Power relay coil 330, when energized, closes its front contact 333 to energize the motor 83 from bus 300 through line 334 to ground. Power relay coil 340, when energized, closes its front contact 343 to energize the motor from bus 300 through contact 343 and line 344 to ground. The motor may be any suitable type of reversing motor, the direction of operation of which is controlled by the selection of one or the other of two energizing leads. The motor may comprise an armature 350 and field coils 351 and 352, with the field coils being connected respectively from lines 334 and 344 to ground and the armature being connected between lines 334 and 344.

As will be apparent, therefore, moving any of the manual switches upwardly energizes the motor to run in one direction and energizes, depending upon the switch closed, the fore and aft solenoid, the front up and down solenoid, the rear up and down solenoid, or both up and down solenoids. By operating the switches in the opposite direction, the solenoids are energized the same way and the motor is energized to operate in the opposite direction. It will be apparent that the four switches provide a very convenient and flexible control of the seat. It will also be apparent that switch 304 could be omitted, in which case concurrent vertical movement of both the front and back parts of the seat could be effected by concurrent operation of switches 302 and 303.

While a specific embodiment of this invention has been shown and described, various changes and modifications may be made without departing from the scope and spirit of the invention.

I claim:

1. In a vehicle body, the combination comprising, a vehicle seat assembly including seat bottom supporting means and a seat back mounted thereon, means mounting said supporting means on said body for horizontal movement relative thereto, a vehicle seat bottom, first bell crank means interconnecting the forward part of said seat bottom and said supporting means, second bell crank means spaced from said first bell crank means and interconnecting the rearward part of said seat bottom and said supporting means, first actuating means operatively connected to said supporting means for selective horizontal movement of said supporting means relative to said body, and second actuating means operatively connected to each of said bell crank means for selective vertical movement of either part of said seat bottom independently of said seat back and selective vertical movement of said entire seat bottom independently of said seat back.

2. In a vehicle body, the combination comprising, a vehicle seat assembly including seat bottom supporting means and a seat back mounted thereon, means mounting said supporting means on said body, a vehicle seat bottom, a first pair of bell cranks pivotally connected to the forward side portions of said seat bottom and said supporting means, a second pair of bell cranks pivotally connected to the rearward side portions of said seat bottom and said supporting means, and actuating means operatively connected to each of said pairs of bell cranks for selective vertical movement of either part of said seat bottom independently of said seat back and selective vertical movement of said entire seat bottom independently of said seat back.

3. In a vehicle body, the combination comprising, a vehicle seat assembly including seat bottom supporting means and a seat back mounted thereon, means mounting said supporting means on said body for horizontal movement relative thereto, a vehicle seat bottom, a first pair of bell cranks pivotally connected to the forward side portions, of said seat bottom and said supporting means, a second pair of bell cranks pivotally connected to the rearward side portions of said seat bottom and said supporting means, first actuating means operatively connected to each of said pairs of bell cranks for selective vertical movement of either part of said seat bottom independently of said seat back and selective vertical movement of said entire seat bottom independently of said seat back, and second actuating means operatively connected to said supporting means for selective horizontal movement of said supporting means relative to said body regardless of the vertical position of said seat bottom.

4. In a vehicle body, the combination comprising, a vehicle seat assembly including seat bottom supporting means and a seat back mounted thereon, means mounting said supporting means on said body, a vehicle seat bottom, a first pair of bell cranks pivotally connected at one arm thereof to the forward side portions of said seat bottom and said supporting means, a second pair of bell cranks pivotally connected at one arm thereof to the rearward side portions of said seat bottom and said supporting means, and actuating means operatively connected to the other arm of each of said pairs of bell cranks for selective vertical movement of either part of said seat bottom independently of said seat back and selective vertical movement of said entire seat bottom independently of said seat back.

5. In a vehicle body, the combination comprising, a vehicle seat assembly including seat bottom supporting means and a seat back mounted thereon, means mounting said supporting means on said body for horizontal movement relative thereto, a vehicle seat bottom, a first pair of bell cranks pivotally connected at one arm thereof to the forward side portions of said seat bottom and said supporting means, a second pair of bell cranks pivotally connected at one arm thereof to the rearward side portions of said seat bottom and said supporting means, first actuating means operatively connected to the other arm of each of said pairs of bell cranks for selective vertical movement of either part of said seat bottom independently of said seat back and selective vertical movement of said entire seat bottom independently of said seat back, and second actuating means operatively connected to said supporting means for selective horizontal movement of said supporting means relative to said body regardless of the vertical position of said seat bottom.

6. In a vehicle body, the combination comprising, a vehicle seat assembly including seat bottom supporting means and a seat back mounted thereon, horizontal slide means including a pair of relatively movable members, one of said members being mounted on said body and the other of said members being secured to said supporting means to mount said supporting means on said body for horizontal movement relative thereto, a first pair of bell cranks pivotally connected along one arm thereof to the forward side portions of said seat bottom and to the other of said members, a second pair of bell cranks spaced from said first pair and pivotally connected along one arm thereof to the rearward side portions of said seat bottom and to said other of said members, first actuating means operatively connected to each of said bell cranks for selective vertical movement of either the forward or rearward part of said seat bottom independently of said seat back and selective vertical movement of said entire seat bottom independently of said seat back, and second actuating means operatively connected to said other of said members for selective horizontal movement of said supporting means regardless of the vertical position of said seat bottom.

7. In a vehicle body, the combination comprising, a vehicle seat assembly including seat bottom supporting means and a seat back mounted thereon, means mounting said supporting means on said body for horizontal movement relative thereto, a vehicle seat bottom, a first pair of bell cranks connected at one arm thereof to the forward side portions of said seat bottom and said supporting means, a second pair of bell cranks connected at one arm thereof to the rearward side portions of said seat bottom and said supporting means, first actuating means operatively connected to each of said pairs of bell cranks for selective vertical movement of either part of said seat bottom independently of said seat back and selective vertical movement of said entire seat bottom independently of said seat back, and second actuating means operatively connected to said supporting means for selective horizontal movement of said supporting means regardless of the vertical position of said seat bottom, said first actuating means including rotatable grooved shafts and nut members selectively operable to travel therealong.

8. In a vehicle body, the combination comprising, a vehicle seat assembly including seat bottom supporting means and a seat back mounted thereon, means mounting said supporting means on said body for horizontal movement relative thereto, a vehicle seat bottom, a first pair of bell cranks connected at one arm thereof to the forward side portions of said seat bottom and said supporting means, a second pair of bell cranks connected at one arm thereof to the rearward side portions of said seat bottom and said supporting means, first actuating means operatively connected to the other arm of each of said pairs of bell cranks for selective vertical movement of either part of said seat bottom independently of said seat back and selective vertical movement of said entire seat bottom independently of said seat back, and second actuating means operatively connected to said supporting means for selective horizontal movement of said supporting means relative to said body regardless of the vertical position of said seat bottom, said first and second actuating means including rotatable lead screw members and nut members threadedly mounted thereon for selective axial movement of said members relative to each other.

References Cited in the file of this patent
UNITED STATES PATENTS

| | | |
|---|---|---|
| 1,664,129 | Pallenberg | May 27, 1928 |
| 2,148,953 | Meissner | Feb. 28, 1939 |
| 2,446,393 | Russell | Aug. 3, 1948 |
| 2,684,108 | Rappl | July 20, 1954 |
| 2,809,688 | Brundage | Oct. 15, 1957 |